(12) United States Patent
Hu (10) Patent No.: US 7,151,845 B2
(45) Date of Patent: Dec. 19, 2006

(54) METHOD FOR GRADUALLY DEFORMING AN INITIAL OBJECT DISTRIBUTION IN A HETEROGENEOUS MEDIUM, GENERATED BY SIMULATION OF AN OBJECT TYPE STOCHASTIC MODEL, TO BEST ADAPT IT TO IMPOSED PHYSICAL CONSTRAINTS

(75) Inventor: Lin-Ying Hu, Rueil Malmaison (FR)

(73) Assignee: Institut Francais du Petrole, Rueil Malmaison Cedex (FR)

( * ) Notice: Subject to any disclaimer, the term of this patent is extended or adjusted under 35 U.S.C. 154(b) by 1083 days.

(21) Appl. No.: 10/091,454

(22) Filed: Mar. 7, 2002

(65) Prior Publication Data

US 2002/0159617 A1 Oct. 31, 2002

(30) Foreign Application Priority Data

Mar. 7, 2001 (FR) .................................. 01 03194

(51) Int. Cl.
  *G06K 9/00* (2006.01)
  *G06K 9/40* (2006.01)
  *G06K 9/38* (2006.01)
(52) U.S. Cl. ....................................... 382/109; 382/254
(58) Field of Classification Search ................ 382/100, 382/109, 157, 173, 190, 225, 254, 260, 266, 382/276; 702/181; 704/232, 245
  See application file for complete search history.

(56) References Cited

U.S. PATENT DOCUMENTS 5,285,395 A * 2/1994 Kamayashi ................. 702/181

5,555,320 A 9/1996 Bunpei ........................ 382/223
2002/0159617 A1 * 10/2002 Hu .............................. 382/109
2003/0156762 A1 * 8/2003 August ........................ 382/260

FOREIGN PATENT DOCUMENTS

EP 0567302 10/1993
FR 2795841 1/2001

OTHER PUBLICATIONS

Decenciere et al "Applications of Kriging To Image Sequence Coding", Signal Processing, Elsevier Science Publishers, Amsterdam, NL, vol. 13, No. 3, 227-249, XP004147538, p. 238.

* cited by examiner

Primary Examiner—Matthew C. Bella
Assistant Examiner—Amir Alavi
(74) Attorney, Agent, or Firm—Antonelli, Terry, Stout and Kraus, LLP.

(57) ABSTRACT

A geostatistical method for gradually deforming an initial distribution of objects, of geologic type for example, from measurements or observations, so as to best adapt it to imposed physical constraints of, for example, a hydrodynamic type having applications of geostatistical modelling of heterogeneous reservoirs of various objects: fracture, channels, vesicles, etc., for example. The objects are distributed in a zone of a heterogeneous medium according to a Poisson point process in form of figurative points with a point density $\lambda(x)$ that varies according to their position (x) in the zone, a realization of a uniform random vector according to which the position of each object is defined while respecting density $\lambda(x)$ is formed, and the uniform random vector is gradually modified according to a gradual deformation process so as to obtain gradual migration of each object until a final realization best adjusted to parameters relative to the structure of the medium, such as hydrodynamic parameters, is obtained.

28 Claims, 5 Drawing Sheets

METHOD FOR GRADUALLY DEFORMING AN INITIAL OBJECT DISTRIBUTION IN A HETEROGENEOUS MEDIUM, GENERATED BY SIMULATION OF AN OBJECT TYPE STOCHASTIC MODEL, TO BEST ADAPT IT TO IMPOSED PHYSICAL CONSTRAINTS

BACKGROUND OF THE INVENTION

1. Field of the Invention

The object of the present invention is a method for gradually deforming an initial distribution of objects of geologic nature, formed by simulation of a stochastic model of object type, from measurements or observations, so as to best adapt it to imposed physical constraints of, for example, a hydrodynamic type.

2. Description of the Prior Art

French Patent 2,780,798 filed by the assignee describes a method for gradually deforming a stochastic model (of Gaussian type or similar) of a heterogeneous medium such as an underground zone, constrained by a series of parameters relative to the structure of the medium. This method comprises drawing a number p of independent realizations (or representations) of the model or of at least part of the selected medium model from all of the possible realizations, and one or more iterative stages of gradual deformation of the model by carrying out one or more successive linear combinations of p independent initial realizations, then composite realizations successively obtained possibly with new draws, etc., the coefficients of this combination being such that the sum of their squares is 1.

French Patent 2,795,841 filed by the assignee describes another method for gradually deforming the representations or realizations, generated by sequential simulation, of a non necessarily Gaussian stochastic model of a physical quantity z in a gridded heterogeneous medium in order to adjust them to a series of data relative to the structure or to the state of the medium, which are collected by prior measurements and observations. The method essentially comprises applying an algorithm allowing gradual deformation of a stochastic model to a Gaussian vector with N mutually independent variables, which is connected to a uniform vector with N mutually independent uniform variables by the Gaussian distribution function so as to define realizations of the uniform vector, and using these realizations to generate representations of this physical quantity z, which are adjusted in relation to the data.

The above methods are applicable to gridded models (pixel type models) suited for modelling continuous quantity fields and they are therefore ill-suited for modelling of zones crossed by fracture networks or channel systems for example.

Models based on objects are spatial arrangements of a population of geometrically defined objects. Basically, an object type model is a Boolean model that can be defined as a combination of objects identical by nature with a random spatial distribution. Boolean models (of object type) are of great interest for the geometric description of heterogeneous media such as meandrous deposit systems, fracture networks, porous media on the grain size scale, vesicle media, etc. Geologic objects are defined by their shape and size. Their location in the field is defined by taking account of their interactions: attraction-repulsion, clustering tendency, etc.

Unlike pixel type models, the models based on objects can provide for example realistic geologic representations of an underground reservoir at an early stage where the data obtained by in-situ measurement are still rare.

The prior art in the sphere of object type models is notably described in the following publications Matheron, G., 1967, "Elément Pour une Théorie des Milieux Poreux", Masson, Paris;

Matheron, G., 1975, "Random sets and Integral Geometry", Wiley, New York;

Serra, J., 1982, "Image Analysis and Mathematical Geology", Vol. I, Academic Press, London Stoyan, D. S. et al., 1995, "Stochastic Geometry and its Applications", $2^{nd}$ Edition, Wiley, Chichester;

Lantuéjoul, C., 1997, "Iterative Algorithms for Conditional Simulations, in Baafi and others, eds."; Geostatistics Wollongong 96, Vol. I, Kluwer Acad. Pubi., Dordrecht, The Netherlands, p. 27–40.

The position of the objects in an object type model is distributed according to the Poisson point process. The shape and the size of the objects are independent of their positions. This model can be generalized by a combination of objects of different nature and/or using a non-stationary density Poisson point process.

Although Boolean models have been widely studied in the literature, there is no coherent and efficient method for constraining these models to the physical data, notably hydrodynamic data, which is however a major challenge for their application to reservoir engineering. The methods allowing gradual deformation of pixel type stochastic reservoir models such as those described for example in the two aforementioned patents cannot be directly used for Boolean models. Constraining Boolean models to hydrodynamic data for example requires development of coherent algorithms for deformation and displacement of the objects.

SUMMARY OF THE INVENTION

The method according to the invention allows generalization of the gradual deformation technique described in the two aforementioned patents to stationary or non-stationary Boolean models, with or without geometric constraint as regards the well. The method appears to be particularly useful notably for reservoir engineers anxious to coherently and efficiently adjust object type reservoir models.

The method according to the invention allows gradual deformation of an initial realization defining the distribution of a set of objects in a zone of a heterogeneous medium such as a geologic structure, formed by simulation of an object type stochastic model, the objects being distributed in the zone according to a Poisson point process in form of figurative points with a point density $\lambda(x)$ that varies according to their position (x) in the zone. It essentially comprises the following steps:

generating a realization of a uniform random vector according to which the position of each object is defined while respecting density $\lambda(x)$; and gradually modifying the uniform random vector according to a gradual deformation procedure, so as to obtain gradual migration of each object and consequently gradual change in the distribution of the objects in the zone, until a final realization best adjusted to parameters relative to the structure of the medium, such as hydrodynamic parameters, is obtained.

It is possible to limit the migration of the figurative points in a subdomain of the zone (a well crossing the zone for example) by imposing a zero point density in the complementary part of the subdomain.

According to an implementation mode, one gradually changes from a realization containing a first set of $N_1$ points to a realization containing a second set of $N_2$ points by constructing a chain N(t) of Poisson numbers between the two numbers $N_1$ and $N_2$, using the gradual deformation procedure.

It is also possible to gradually deform the size, the shape and the orientation of an object during its migration by using the gradual deformation procedure.

In cases where it contains errors, it is also possible to gradually adjust the point density λ(x) by using the gradual deformation procedure.

The final realization obtained by means of the method is a realistic representation of the configuration of the objects in the heterogeneous medium.

The method according to the invention finds applications in the sphere of underground zones modelling intended to generate representations showing how a certain physical quantity is distributed in a subsoil zone (permeability for example) and which are best compatible with observed or measured data: geologic data, seismic records, measurements obtained in wells, notably measurements of the variations with time of the pressure and of the flow rate of fluids from a reservoir, etc.

BRIEF DESCRIPTION OF THE DRAWINGS

Other features and advantages of the method according to the invention will be clear from reading the detailed description hereafter, with reference to the accompanying drawings wherein:

FIGS. 2A to 2D show various examples of gradual migration trajectories between two points of a non-stationary Poisson point process;

DETAILED DESCRIPTION

General Points

The geologic objects to which the method applies are for example more or less large fractures inside a reservoir zone, or channels. The method can also apply to granular or vesicle type structures of much smaller size. All these objects are difficult to model by means of pixel type models.

The progressive migration operations described hereafter apply to an initial model where the positions of the objects are represented by point configurations (referred to as point procedures). The distribution of these points varies in density according to their positions in the modelled zone. This distribution is based on various data known from measurements or observations: geomechanical measurements obtained in wells for example, seismic data obtained from prior seismic operations.

Starting from this initial model, the method allows gradual deformation of the initial distribution according to a series of rules so that, in the final distribution, the model is optimized in order to better correspond to constraints imposed on one or more physical parameters such as, for example, a distribution of permeability values. The migration rules are such that a great number of different points of the model can be globally displaced from a limited number of control parameters.

An objective function measuring the difference between the physical parameters from the real heterogeneous medium and those simulated on a realization of the stochastic model is generally defined. The value of the objective function therefore depends on control parameters of the stochastic model. The values of these control parameters are obtained by minimizing the objective function.

Summary of the Poisson Point Process

The Poisson point process is a countable random set of points distributed in any space $\Re^n$. This set of points has the following characteristics:

Let D be a domain of $\Re^n$. If the volume of D, denoted by |D|, is finite, then the numbers of points lying in D, denoted by N(D), follows a Poisson's law of parameter λ|D|. Let:

$$P[N(D) = n] e^{-\lambda |D|} \frac{(\lambda |D|)^n}{n!} \forall n \geq 0 \qquad (1)$$

where λ is called the point process density; it measures the average number of points lying in a unitary volume domain of $\Re^n$.

Let $D_1, D_2, \ldots, D_k$ be domains of $\Re^n$ unconnected two by two, then the numbers of points lying in these domains $N(D_1), N(D_2), \ldots, N(D_k)$ are mutually independent random variables.

Conditionally on $N(D)=n_p$, these $n_p$ points are independent and evenly distributed in D.

The description hereafter presents the Poisson point process in the finite domain D.

Migration of a Stationary Poisson Point Process

Consider the problem of the migration of a realization of a stationary Poisson point process in D rectangular. In order to simplify the presentation, D is assumed to be a unitary hypercube $[0,1]^n$ with n dimensions. Let $x_1$ and $x_2$ be two independent points uniformly drawn from $[0,1]^n$. We define a trajectory between $x_1$ $$x(t) = G[G^{-1}(x_1) \cos t + G^{-1}(x_2) \sin t] \qquad (2)$$

and $x_2$ by:

where G is the centered and reduced Gaussian distribution function. According to the gradual deformation algorithm described in the aforementioned French patent 2,780,798, for any t, x(t) is a uniform point in $[0,1]^n$. When the two points are fixed, the trajectory of the gradual migration between them is entirely determined. The place change of one of the two points will change the migration trajectory. It can be shown that the trajectory defined by Equation (2) is symmetrical in relation to the centre of the domain $[0,1]^n$, whatever the number of dimensions n. This suggests that, even if the two points are isolated in a corner/side of the domain, the trajectory of the gradual migration between them can always reach the opposite part of the domain.

Migration of a Non-stationary Poisson Point Process

Consider now the Poisson point process in a domain D of density $\lambda(x)$ of general shape. The number of points in D is a random Poisson variable of average $\lambda(D)=\int_D \lambda(x)dx$. These points are independently distributed in D according to the probability density function:

$$f(x)=\lambda(x)/\lambda(D) x \in D \quad (3)$$

Simulation of a Poisson point process of density $\lambda(x)$ in D can be carried out in two stages:

generating a number n according to Poisson's law of average equal to $\lambda(D)$, then generating n points in D irrespective of one another according to the same probability density f(x).

Figure 1A:
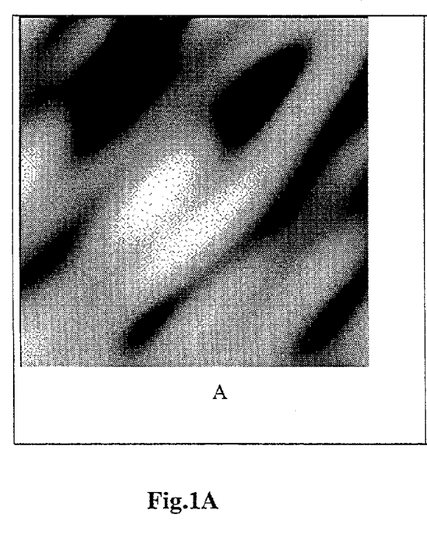
FIGS. 1A, 1B respectively show a density function of a non-stationary Poisson point process and a realization of the non-stationary Poisson point process generated by the sequential method
Figure 1B:
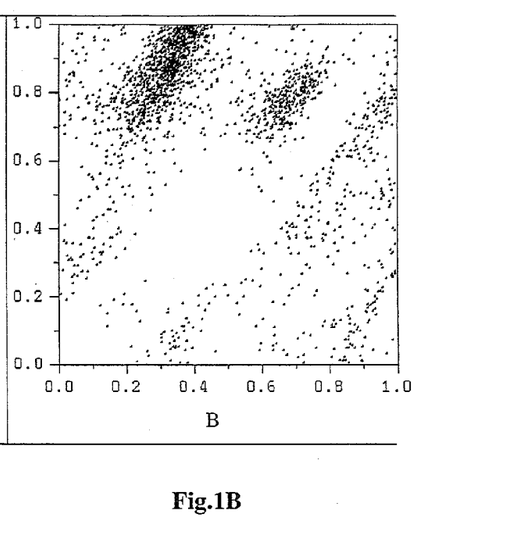
Figure 2B:
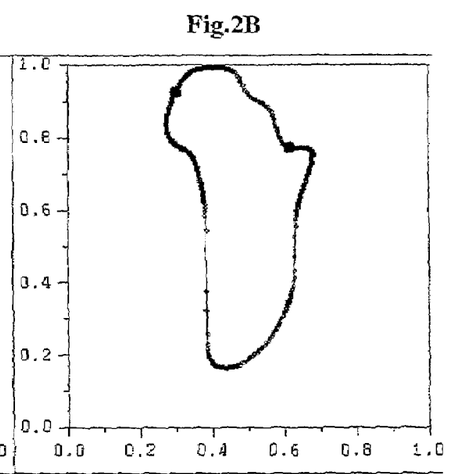
Figure 2C:
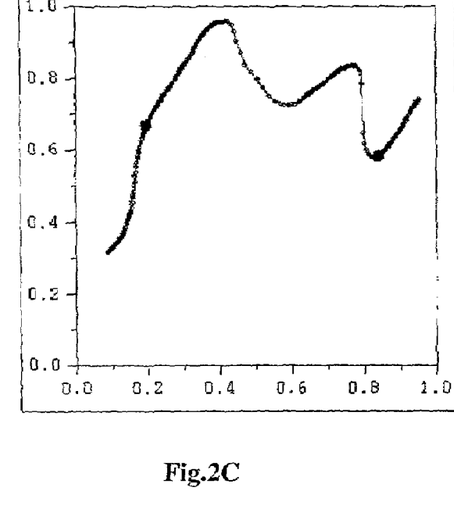
Figure 2D:
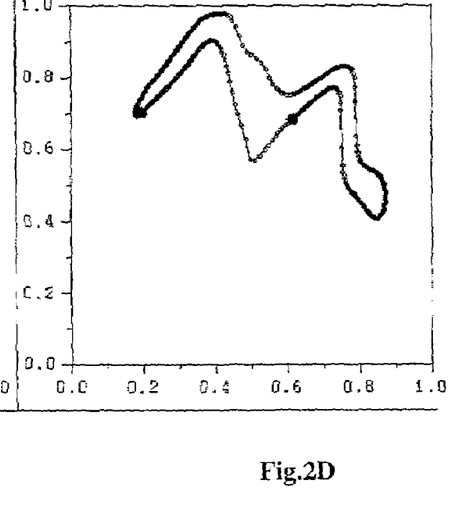
Figure 3:
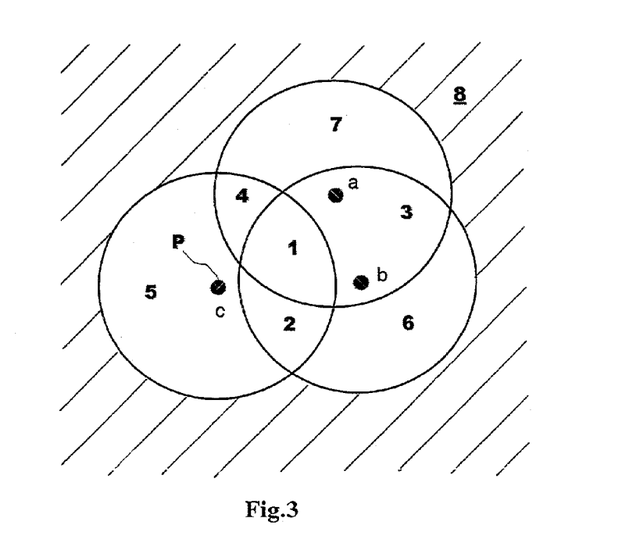
FIGS. 3A to 3H show various successive stages of a realization of the non-stationary Poisson point process during the gradual migration of the points.
Figure 4A:
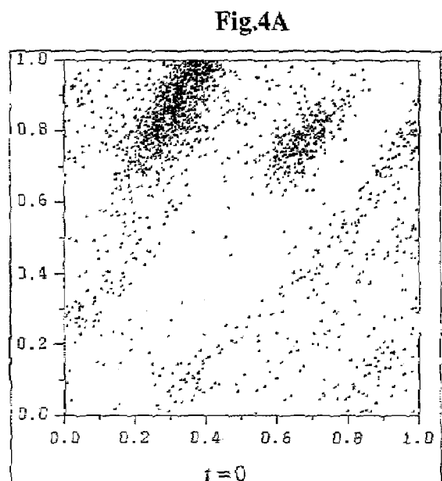
FIG. 4 shows the possible domains of migration of a disk in the case of three conditioning points.
Figure 4B:
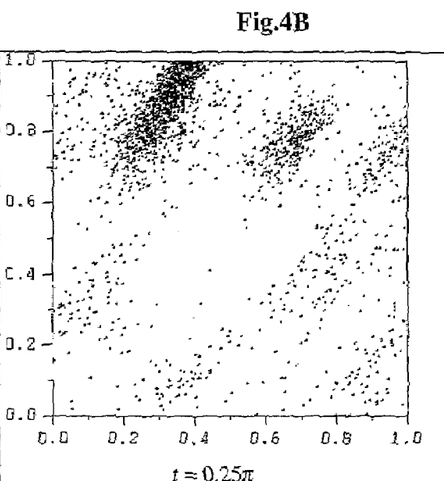
Figure 4C:
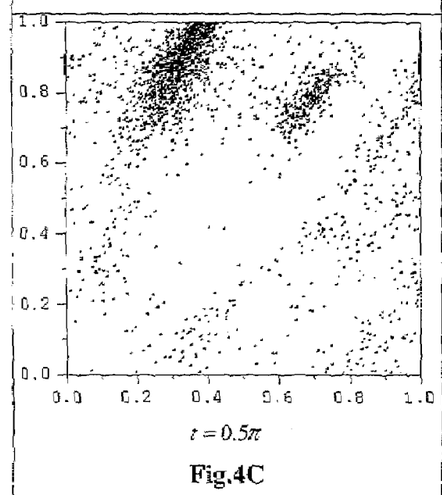
Figure 4D:
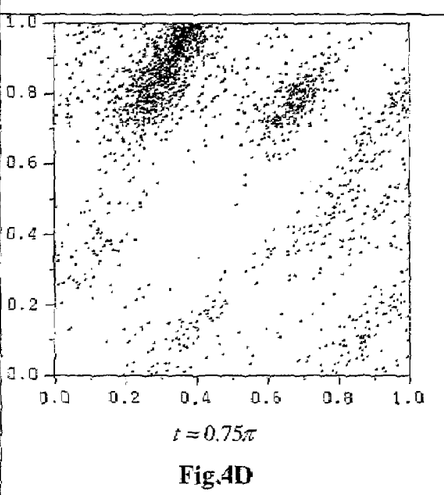
Figure 4F:
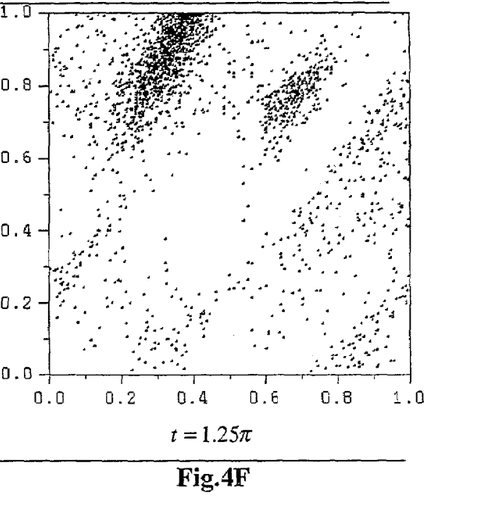
Figure 4G:
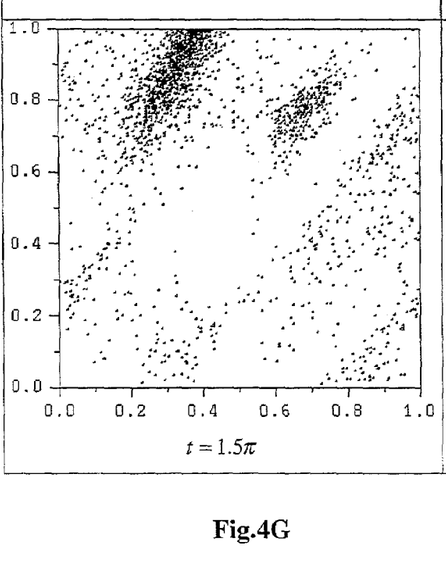
Figure 4H:
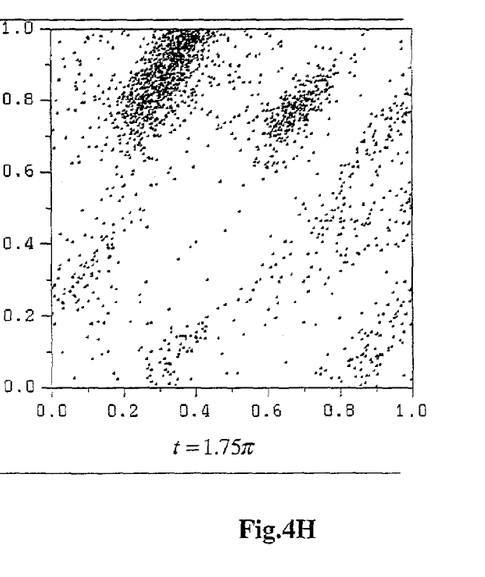
Figure 5:
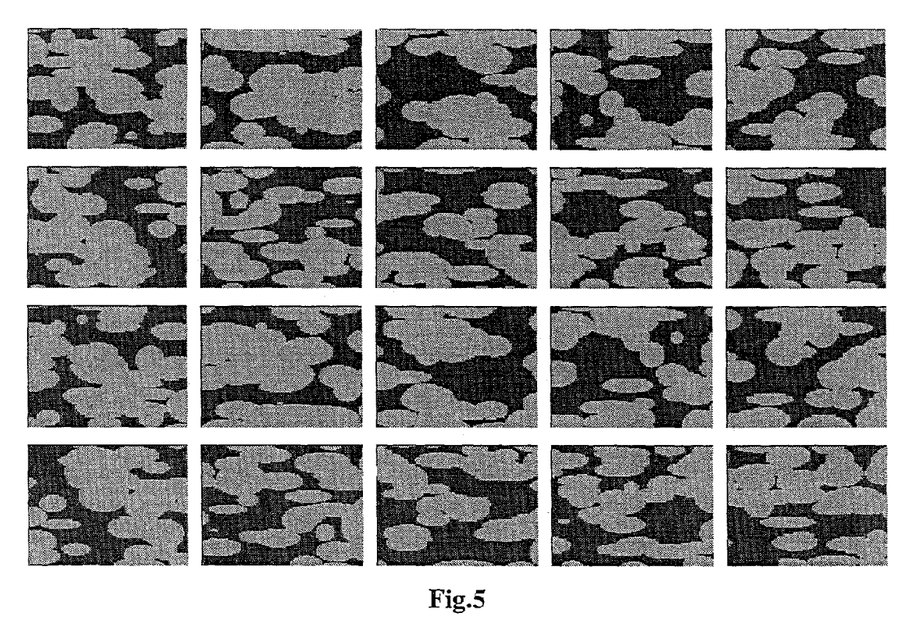
FIG. 5 shows, by way of example, a complete chain of successive realizations of a Boolean simulation of elliptical objects where deformation parameter t ranges between $-\pi$ and $\pi$ by intervals $\Delta t = 0.1\pi$.
Figure 6:
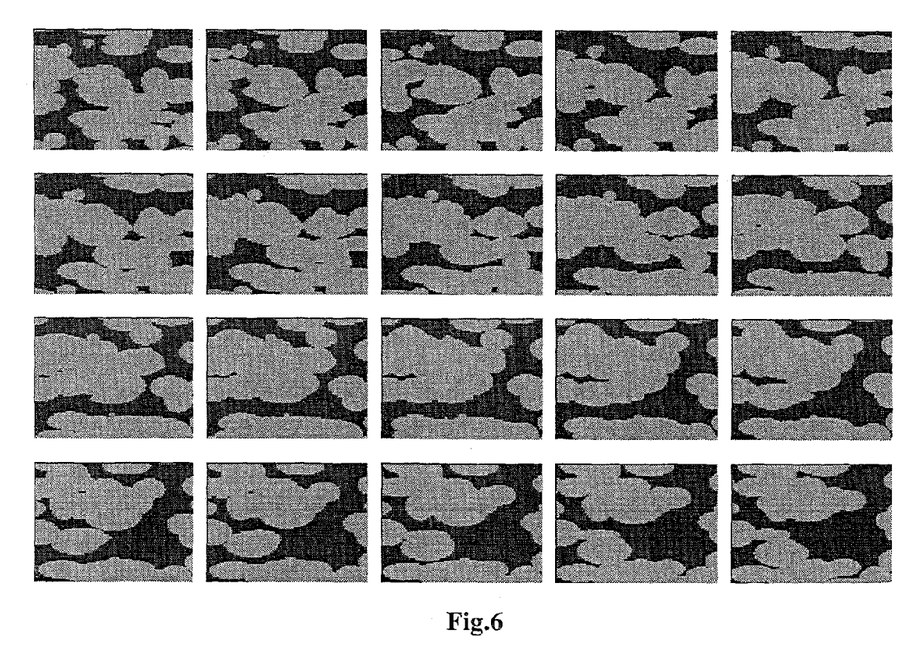
FIG. 6 shows, by way of example, an incomplete chain of successive realizations of a Boolean simulation of elliptical objects where deformation parameter t ranges between 0 and $0.2\pi$ by intervals $\Delta t = 0.01\pi$.

The example of FIG. 1A shows a density function, and FIG. 1B shows a realization of a Poisson point process of density $\lambda(x)$.

If law f(x) is simulated by inversion of its distribution function, then point x corresponds to a uniform vector u. The gradual migration algorithm can thus be applied to the Poisson point process of density $\lambda(x)$. By construction, this method preserves the density and the number of points of the initial process. FIGS. 2A to 2D show four migration trajectory examples.

Take the example of the non-stationary Poisson point process in a two-dimensional domain $D=[0,1]^2$ whose density increases linearly in axis X and is constant in axis Y. Let (x,y) be the vector of the coordinates of a point in D of this process. Then, (x,y) admits the bivariable probability density:

$$f(x,y)=2x, (x,y)\in[0,1]^2 \quad (4)$$

Simulation of a point according to the above law (4) is simple generating abscissa x according to the linear density f(x)=2x, then generating ordinate y uniformly between 0 and 1.

Let:

$$x=\sqrt{u}$$

$$y=v \quad (5)$$

where u and v are two independent and uniform numbers between 0 and 1.

Thus a gradual migration algorithm (2) can be applied to the uniform vector (u,v) in order to establish a migration trajectory for point (x,y) in D.

In practice, density function $\lambda(x)$ often comes in form of a grid. By way of example, consider the case of a two-dimensional grid of M×N nodes. Let $x_i$ and $y_j$ be the coordinates of node (i,j). The marginal law for $x_i$ is then $$f(x_i) = \sum_{j=1}^{N} f(x_i, y_j) \quad (6)$$

and the conditional law for $y_j$, knowing $x_i$, is:

The points of the Poisson process of density $\lambda(x)$ can thus be readily $$f_{x_i}(y_j)=f(x_i,y_j)/f(x_i) \quad (7)$$

generated on a grid from these monovariable probability laws.

By way of illustration, a two-dimensional density function is constructed from a centered and reduced Gaussian simulation. The variogram is anisotropic and of Gaussian type. The principal anisotropy directions are diagonal in relation to the coordinates system. The scale factors in the principal anisotropy directions are 0.3 and 0.1 respectively. The size of the field is 1×1 and it is discretized in 1000×1000 pixels. The Gaussian numbers are changed into positive numbers according to the following expression $$\lambda(x)=400e^{\sqrt{3}Y(x)} \quad (8)$$

where Y(x) is the Gaussian simulation. FIG. 1A shows the density function thus constructed. FIG. 1B shows a Poisson point process realization admitting the density function of FIG. 1A. 2000 points are generated according to the sequential method.

FIGS. 3A to 3H illustrate the evolution of a Poisson process realization during gradual migration of the points. It can be seen that the point density is respected during the migration.

Migration of Conditional Boolean Simulation Objects

The above method can be immediately applied to the migration of a domain S of any form in D. In fact, the migration of a point in S can be carried out in D using the truncated probability density function:

$$f_s(x)=\lambda(x)1_{x \in S}/\lambda(S), x \in D, S \subset D \quad (9)$$

Using the Markovian iteration algorithm described in the reference to Lantuéjoul, 1997, it is possible to simulate a Boolean model in a domain D knowing that two subsets $C_1$ and $C_0$ of D respectively belong to the union of the objects and to its complement. Then, the migration algorithms in any domain can be used for gradual deformation of the Boolean simulations conditioned by geometric well data. In fact, from a conditional Boolean simulation and without compromising conditioning by $C_1$ and $C_0$, the objects must move only in their respective domains defined according to the shape of the objects and the configuration of $C_1$ and $C_0$.

Consider an object A of a conditional Boolean realization, which includes a subset $C_{1A}$ of $C_1$ and excludes $C_0$. If, during migration of A, it still has to include $C_{1A}$ but excludes $C_0$, the allowed migration domain for object A is:

$$D_A=\{x:C_0 \cap A_x=\emptyset; C_{1A} \subset A_x\} \quad (10)$$

FIG. 4 shows a case with three conditioning points and the eight possible domains of migration of a disk. If, for example, the disk is supposed to always cover points (a) and (b) but avoid point (c), then its centre can move only in domain 3.

Migration with Appearance and Disappearance of Points

The number of points in D of a point process follows a Poisson's law of parameter $\lambda(D)$. It is therefore necessary to vary the number of points in D during their migration. In this section, two methods of constructing Poisson number chains are first presented, and then how to migrate between two sets of points whose cardinals are not identical is presented.

A chain of Poisson numbers is attempted to be constructed between two Poisson numbers $N_1$ and $N_2$, independently generated by inversion of the distribution function. Let $U_1$ and $U_2$ be two independent uniform numbers (between 0 and 1) from which numbers $N_1$ and $N_2$ are obtained.

$$N_1=F^{-1}(U_1)$$

$$N_2=F^{-1}(U_2) \quad (11)$$

where $F^{-1}$ represents the inverse distribution function of Poisson's law. According to the gradual deformation algorithm, a chain of uniform numbers can be constructed between $U_1$ and $U_2$ by:

$$U(t)=G[G^{-1}(U_1)\cos t+G^{-1}(U_2)\sin t] \quad (12)$$

By inversion of the distribution function of Poisson's law, a chain of Poisson numbers is obtained.

$$N(t)=F^{-1}[U(t)] \quad (13)$$

The inverse distribution function can be calculated by dichotomy. However, if the parameter of Poisson's law is too great, this method remains quite costly.

In order to save calculating the inverse distribution function of Poisson's law, another way of generating Poisson's numbers can be considered. It is well-known that the number of jumps of a Poisson process of parameter 1, in a segment of length $\lambda$, precisely follows a Poisson's law of parameter $\lambda$. Simulation of a Poisson process is easy to do. In fact, the intervals between two consecutive jumps of the process are independent and follow the exponential law of parameter 1. By gradually deforming the exponential segments, a chain of Poisson numbers is obtained. It is easy to construct a chain of exponential numbers because calculation of the inverse distribution function of the exponential law is easy. It can be reminded here that the distribution function of the exponential law of parameter 1 is written as follows:

$$F(s)=1-e^{-s},\ s>0 \quad (14)$$

and its inverse function is:

$$F^{-1}(u)=-\ln(1-u),\ 0<u<1 \quad (15)$$

The fact remains that, since the number of jumps in the segment of length $\lambda$ is $\lambda$ on average, the number of chains of exponential numbers is close to $\lambda$ on average.

Now the migration of a set of $N_1$ points (set 1) to a set of $N_2$ points (set 2) is considered. Since $N_1 \neq N_2$, the migration from set 1 to set 2 necessarily implies the appearance or the disappearance of certain points. The number of points that will appear or disappear is determined by the chain of Poisson numbers between $N_1$ and $N_2$. The migration algorithm is as follows:

a) Calculate the maximum number $N_{max}$ of chain $N(t)$.
b) Complete set 1 with $N_{max}-N_1$ points and set 2 with $N_{max}-N_2$ points.
c) For each set, order the points from 1 to $N_{max}$. All the initial points are ordered from the beginning.
d) Calculate the migration trajectory of point n of set 1 to point n of set 2 (n=1,2, . . . ,$N_{max}$).
e) For each state t of the set, remove the $N_{max}-N(t)$ last points.

The invention claimed is:

1. A method for gradually deforming an initial realization formed from measurements or observations and defining a distribution of a set of objects in a zone of a heterogeneous medium, generated by simulation of an object type stochastic model, the objects being distributed in the zone according to a Poisson point process in a form of figurative points with a point density $\lambda(x)$ varying according to their position (x) in the zone, comprising:
   generating a realization of a uniform random vector according to which a position of each object is defined while respecting density $\lambda(x)$; and
   gradually modifying the uniform random vector according to a gradual deformation procedure, so as to obtain gradual migration of each object and consequently gradual change in the distribution of the objects in the zone, until a final realization best adjusted to parameters relative to the structure of the medium, is obtained, which gives a realistic representation of the configuration of the objects in the modelled heterogeneous medium.

2. A method as claimed in claim 1, wherein migration of the figurative points representing objects in a subdomain of the zone is limited by imposing a zero point density in the complementary part of the subdomain.

3. A method as claimed in claim 2, wherein a realization containing a first set of N1 points is gradually changed to a realization containing a second set of N2 points by constructing a chain N(t) of Poisson numbers between the two numbers N1 and N2 using the gradual deformation procedure.

4. A method as claimed in claim 3, wherein point density ((x) is gradually adjusted using the gradual deformation procedure.

5. A method as claimed in claim 4 wherein the medium is a geologic structure and the parameters are hydrodynamic parameters.

6. A method as claimed in claim 3 wherein the medium is a geologic structure and the parameters are hydrodynamic parameters.

7. A method as claimed in claim 2, where size, shape and orientation of an object are gradually modified during it's the migration of the object using the gradual deformation procedure.

8. A method as claimed in claim 7, wherein point density ((x) is gradually adjusted using the gradual deformation procedure.

9. A method as claimed in claim 8 wherein the medium is a geologic structure and the parameters are hydrodynamic parameters.

10. A method as claimed in claim 7 wherein the medium is a geologic structure and the parameters are hydrodynamic parameters.

11. A method as claimed in claim 2, wherein point density ((x) is gradually adjusted using the gradual deformation procedure.

12. A method as claimed in claim 11 wherein the medium is a geologic structure and the parameters are hydrodynamic parameters.

13. A method as claimed in claim 2 wherein the medium is a geologic structure and the parameters are hydrodynamic parameters.

14. A method as claimed in claim 1, wherein a realization containing a first set of N1 points is gradually changed to a realization containing a second set of N2 points by constructing a chain N(t) of Poisson numbers between the two numbers N1 and N2 using the gradual deformation procedure.

15. A method as claimed in claim 14,
   wherein size, shape and orientation of an object are gradually modified during it's the migration of the object using the gradual deformation procedure.

16. A method as claimed in claim 15, wherein point density ((x) is gradually adjusted using the gradual deformation procedure.

17. A method as claimed in claim 16 wherein the medium is a geologic structure and the parameters are hydrodynamic parameters.

18. A method as claimed in claim 15 wherein the medium is a geologic structure and the parameters are hydrodynamic parameters.

19. A method as claimed in claim 14, wherein point density ((x) is gradually adjusted using the gradual deformation procedure.

20. A method as claimed in claim 19 wherein the medium is a geologic structure and the parameters are hydrodynamic parameters.

21. A method as claimed in claim 14 wherein the medium is a geologic structure and the parameters are hydrodynamic parameters.

22. A method as claimed in claim 1, wherein size, shape and orientation of an object are gradually modified during it's the migration of the object using the gradual deformation procedure.

23. A method as claimed in claim 22, wherein point density ((x) is gradually adjusted using the gradual deformation procedure.

24. A method as claimed in claim 23 wherein the medium is a geologic structure and the parameters are hydrodynamic parameters.

25. A method as claimed in claim 22 wherein the medium is a geologic structure and the parameters are hydrodynamic parameters.

26. A method as claimed in claim 1, wherein point density ((x) is gradually adjusted using the gradual deformation procedure.

27. A method as claimed in claim 26 wherein the medium is a geologic structure and the parameters are hydrodynamic parameters.

28. A method as claimed in claim 1 wherein the medium is a geologic structure and the parameters are hydrodynamic parameters.

* * * * *